United States Patent
Watkins

[11] Patent Number: 5,970,647
[45] Date of Patent: Oct. 26, 1999

[54] FISHING LURE

[76] Inventor: John Walker Watkins, P.O. Box 602, Mountain City, Ga. 30562

[21] Appl. No.: 09/262,195

[22] Filed: Mar. 4, 1999

[51] Int. Cl.[6] .................................................. A01K 85/01
[52] U.S. Cl. .......................................... 43/42.31; 43/42.09
[58] Field of Search ............................... 43/42.09, 42.11, 43/42.13, 42.15, 42.19, 42.2, 42.31, 42.25, 42.27, 42.36

[56] References Cited

U.S. PATENT DOCUMENTS

| | | | |
|---|---|---|---|
| 1,816,725 | 7/1931 | Freeman | 43/41 |
| 2,187,666 | 1/1940 | Schumann | 43/42.27 |
| 2,328,295 | 8/1943 | Provost | 43/42.25 |
| 2,481,789 | 9/1949 | Smith | 43/42.15 |
| 2,494,407 | 1/1950 | Rhodes | 43/42.05 |
| 2,853,826 | 9/1958 | Romeo | 43/42.31 |
| 3,367,059 | 2/1968 | Puls et al. | 43/42.14 |
| 4,054,004 | 10/1977 | Schott | 43/42.09 |
| 5,497,581 | 3/1996 | Williams | 43/42.31 |

Primary Examiner—Michael J. Carone
Assistant Examiner—Son T. Nguyen

[57] ABSTRACT

A fishing lure for attracting fish to a hook attached to a lure resembling an insect, especially a bee. The fishing lure includes a body member with front and back ends and an outer surface shaped to resemble an insect. The front end of the body member is designed for securing a fishing line thereto. The body member has a back portion with an interior cavity therein. An elongate back shaft is extended into the interior cavity of the back portion through the back end of the body member. A first end of the back shaft is rotatably coupled to the back portion of the body member to permit free rotation of the back shaft about the longitudinal axis of the back shaft. A second end of the back shaft is designed for securing a fishing hook thereto. The second end of the back shaft has a rear eye loop with a propeller blade coupled thereto.

8 Claims, 3 Drawing Sheets

FISHING LURE

BACKGROUND OF THE INVENTION

1. Field of the Invention

The present invention relates to fishing lures and more particularly pertains to a new fishing lure for attracting fish to a hook attached to a lure resembling an insect, especially a bee.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,906,791; U.S. Pat. No. 3,909,974; U.S. Pat. No. 5,694,714; U.S. Pat. No. 3,831,307; U.S. Pat. No. Des. 172,024; and U.S. Pat. No. 5,036,617.

While these devices fulfill their respective, particular objectives and requirements, the aforementioned patents do not disclose a new fishing lure. The inventive device includes a body member with front and back ends and an outer surface shaped to resemble an insect. The front end of the body member is designed for securing a fishing line thereto. The body member has a back portion with an interior cavity therein. An elongate back shaft is extended into the interior cavity of the back portion through the back end of the body member. A first end of the back shaft is rotatably coupled to the back portion of the body member to permit free rotation of the back shaft about the longitudinal axis of the back shaft. A second end of the back shaft is designed for securing a fishing hook thereto. The second end of the back shaft has a rear eye loop with a propeller blade coupled thereto.

In these respects, the fishing lure according to the present invention substantially departs from the conventional concepts and designs of the prior art, and in so doing provides an apparatus primarily developed for the purpose of attracting fish to a hook attached to a lure resembling an insect, especially a bee.

SUMMARY OF THE INVENTION

In view of the foregoing disadvantages inherent in the known types of fishing lures now present in the prior art, the present invention provides a new fishing lure construction wherein the same can be utilized for attracting fish to a hook attached to a lure resembling an insect, especially a bee.

The general purpose of the present invention, which will be described subsequently in greater detail, is to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

To attain this, the present invention generally comprises a body member with front and back ends and an outer surface shaped to resemble an insect. The front end of the body member is designed for securing a fishing line thereto. The body member has a back portion with an interior cavity therein. An elongate back shaft is extended into the interior cavity of the back portion through the back end of the body member. A first end of the back shaft is rotatably coupled to the back portion of the body member to permit free rotation of the back shaft about the longitudinal axis of the back shaft. A second end of the back shaft is designed for securing a fishing hook thereto. The second end of the back shaft has a rear eye loop with a propeller blade coupled thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

It is another object of the present invention to provide a new fishing lure which may be easily and efficiently manufactured and marketed.

It is a further object of the present invention to provide a new fishing lure which is of a durable and reliable construction.

An even further object of the present invention is to provide a new fishing lure which is susceptible of a low cost of manufacture with regard to both materials and labor, and which accordingly is then susceptible of low prices of sale to the consuming public, thereby making such fishing lure economically available to the buying public.

Still yet another object of the present invention is to provide a new fishing lure which provides in the apparatuses and methods of the prior art some of the advantages thereof, while simultaneously overcoming some of the disadvantages normally associated therewith.

Still another object of the present invention is to provide a new fishing lure for attracting fish to a hook attached to a lure resembling an insect, especially a bee.

Yet another object of the present invention is to provide a new fishing lure which includes a body member with front and back ends and an outer surface shaped to resemble an insect. The front end of the body member is designed for securing a fishing line thereto. The body member has a back portion with an interior cavity therein. An elongate back shaft is extended into the interior cavity of the back portion through the back end of the body member. A first end of the back shaft is rotatably coupled to the back portion of the body member to permit free rotation of the back shaft about the longitudinal axis of the back shaft. A second end of the back shaft is designed for securing a fishing hook thereto. The second end of the back shaft has a rear eye loop with a propeller blade coupled thereto.

Still yet another object of the present invention is to provide a new fishing lure that also produces sound vibrations to attract fish to the lure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
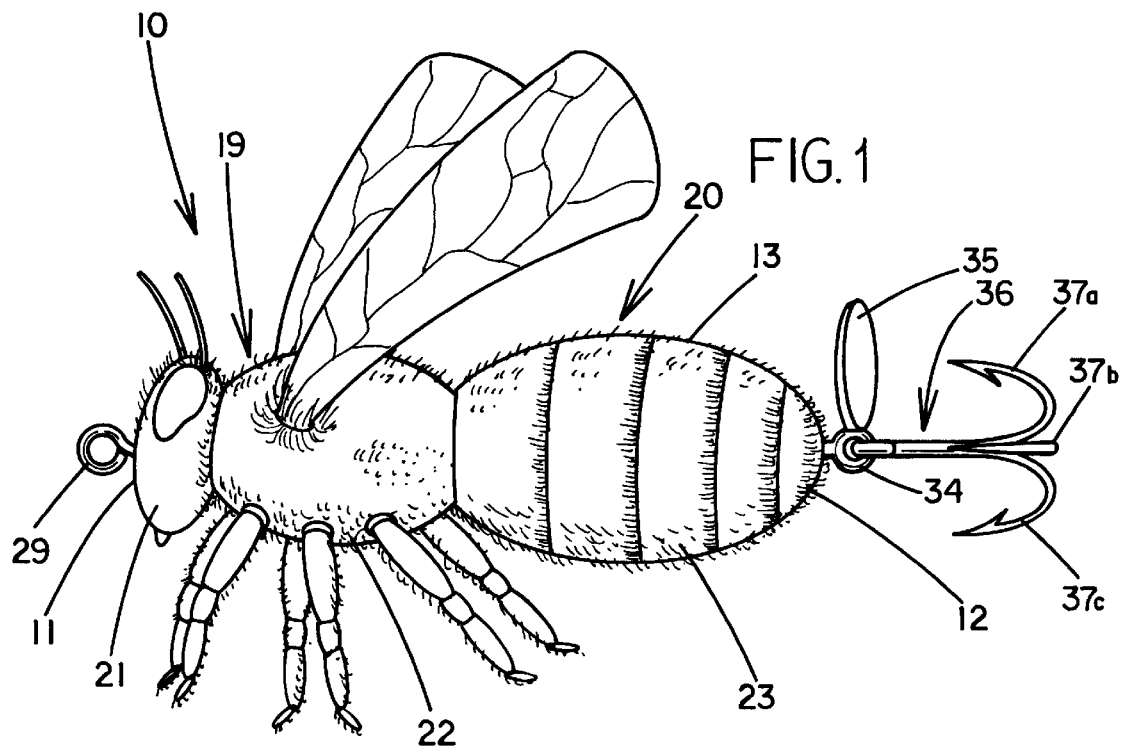
FIG. 1 is a schematic side view of a new fishing lure according to the present invention.
Figure 2:
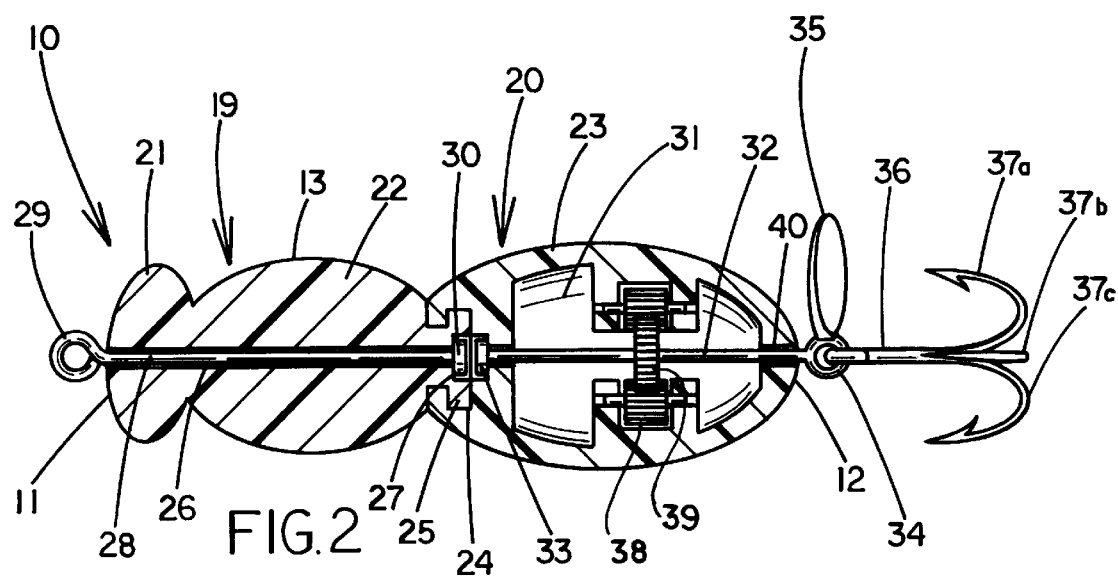
FIG. 2 is a schematic cross sectional view of the present invention.
Figure 3:
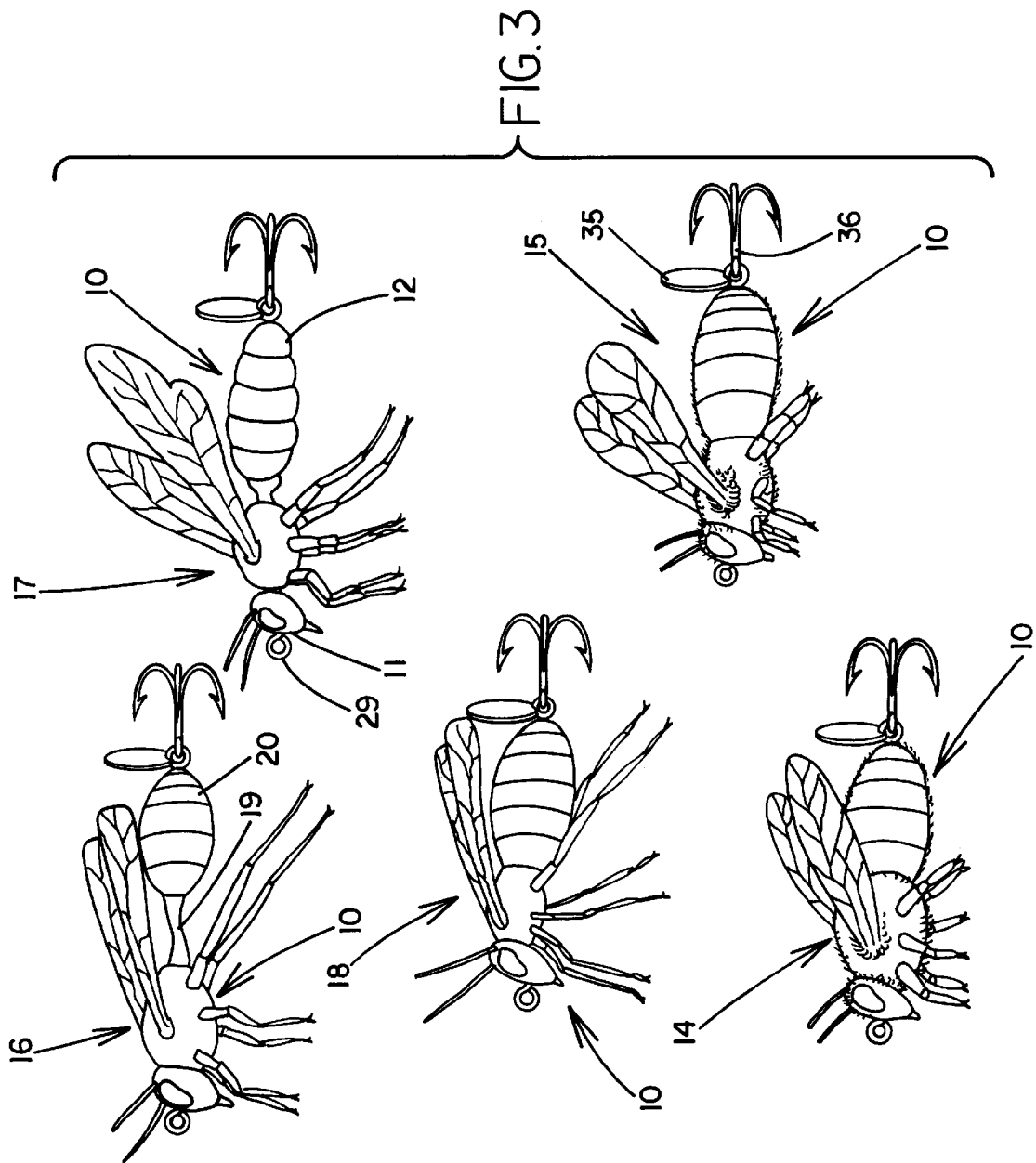
FIG. 3 is a schematic side view of several body members illustrating a variety of insect shapes the outer surface of the body member may be formed to resemble.

With reference now to the drawings, and in particular to FIGS. 1 through 3 thereof, a new fishing lure embodying the principles and concepts of the present invention will be described.

As best illustrated in FIGS. 1 through 3, the fishing lure generally comprises a body member 10 with front and back ends 11, 12 and an outer surface 13 shaped to resemble an insect. The front end of the body member is designed for securing a fishing line thereto. The body member has a back portion 20 with an interior cavity 31 therein. An elongate back shaft 32 is extended into the interior cavity of the back portion through the back end of the body member. A first end 33 of the back shaft is rotatably coupled to the back portion of the body member to permit free rotation of the back shaft about the longitudinal axis of the back shaft. A second end of the back shaft is designed for securing a fishing book thereto. The second end of the back shaft has a rear eye loop 34 with a propeller blade 35 coupled thereto.

In closer detail, the fishing lure comprises a body member 10 with has front and back ends 11, 12, and an outer surface 13 defining an interior boundary therein. The body member has a longitudinal axis extending between the front and back ends of the body member. The outer surface of the body member is shaped to resemble an insect. Preferably, the outer surface of the body member is shaped to resemble a bee such as a bumble bee 14 or a honey bee 15. The outer surface of the body member may also be shaped to resemble other insects such as a mud-dauber 16, a wasp 17, or a hornet 18.

The body member has front and back portions 19, 20. The front portion 19 of the body member is positioned adjacent the front end 11 of the body member. The back portion 20 of the body member is positioned adjacent the back end 12 of the body member. Preferably, the outer surface of the front portion is shaped to resemble the head 21 and thorax 22 of an insect and has elements shaped to resemble the eyes, antennae, legs and wings of the resembled insect. The outer surface of the back portion is preferably shaped to resemble the abdomen 23 of the resembled insect.

In a preferred embodiment, the front and back portions of the body member are detachably attached to one another so that the body member can come with a plurality of front portions resembling a variety of insects that are all attachable to a common back portion. The back portion of the body member has a socket 24 therein distal the back end of the body member. The front portion of the body member has a plug 25 distal the front end of the body member. In this embodiment, the front and back portions of the body member each ideally comprise a resiliently deformable material such as a resiliently deformable rubber or plastic material. This allows the plug of the front portion to be inserted into the socket of the back portion by resiliently squeezing the plug into the socket to detachably attach the front and back portions of the body member together.

Ideally, the front portion of the body member is formed by a substantially solid material substantially occupying the entire interior boundary of front portion of the body member for providing additional weight to the body member to help keep it submerged in the water. The front portion of the body member preferably has an axial bore 26 through along the longitudinal axis of the body member. The axial bore of the front portion has a pair of opposite ends. A first of the ends of the axial bore of the front portion forms a front opening in the front end of the body member. The axial bore of the front portion has an annular shoulder 27 formed at a second of the ends of the axial bore of the front portion.

An elongate front shaft 28 is extended into the axial bore of the front portion so that the front shaft is rotatable in the axial bore of the front portion about the longitudinal axis of the body member. The front shaft has forwards and rearwards ends. The forwards end of the front shaft is outwardly extended from the front end of the body member. The forwards end of front shaft has a front eye loop 29 designed for securing a fishing line thereto. The rearwards end of the front shaft has a disk-shaped stop 30 abutting the annular shoulder of the axial bore of the front portion. The diameter of the stop 30 of the front shaft is greater than the axial bore 26 of the front portion to prevent pulling of the front shaft out of the axial bore of the front portion from the front end of the body member.

The back portion of the body member has an interior cavity 31 therein. The interior cavity preferably occupies at least one half of the area of the interior boundary of the back portion of the body member. An elongate back shaft 32 is provided having opposite first and second ends, and a longitudinal axis extending between the first and second ends of the back shaft. The back shaft is extended into the interior cavity of the back portion through an axial rear bore 40 extending between the interior cavity and the back end of the body member. The first end of the back shaft is extended towards the front end of the body member and the second end of the back shaft is outwardly extended from the back end of the body member with the longitudinal axes of the back shaft and the body member ideally coaxial with one another.

The first end of the back shaft is rotatably coupled to the back portion of the body member to permit free rotation of the back shaft about the longitudinal axis of the back shaft with respect to the body member. Preferably, this is accomplish by the first end of the back shaft having a disk-shaped stop 30 to prevent removal of the back shaft by pulling from the back end of the body member.

The second end of the back shaft has a rear eye loop 34. The rear eye loop has a propeller blade 35 coupled thereto which extends in a generally perpendicular direction outwards from the longitudinal axis of the back shaft. In use, the propeller blade is designed for rotating the back shaft as the body member is moved through the water.

A fishing hook 36 is coupled to the rear eye loop. Preferably, the fishing hook has a least three barbs 37a, 37b, 37c equidistantly spaced apart around an end of a stem of the fishing hook for providing even movement of the body member through the water as the fishing hook is rotated by the back shaft (the body member would has uneven movement if the fishing hook only has one barb).

Preferably, a set of interconnected gears 38 is provided in the interior cavity of the back portion. The set of interconnected gears includes a drive gear 39 mounted on the back shaft such that rotation of the back shaft rotates the drive gear to rotate the set of interconnected gears. In use, the set of interconnected gears produces sound vibrations when rotated by the back shaft. In use, the noise of the sound vibrations travelling through the water to help attract fish to the fishing lure.

In an ideal illustrative embodiment, the body member has a length defined between the front and back ends of the body member of between about 1½ inches and about 2 inches, and a width perpendicular to the length of about ½ inch.

Figure 4:
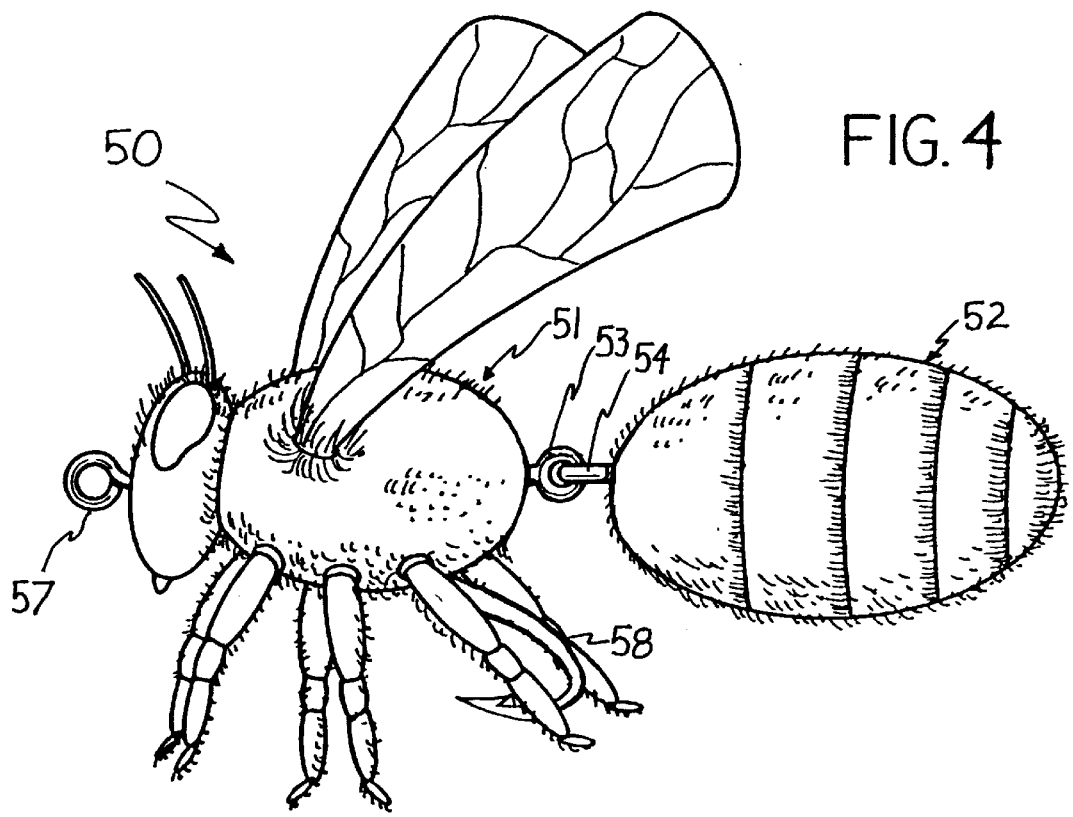
FIG. 4 is a schematic side view of another embodiment of the fishing lure.
Figure 5:
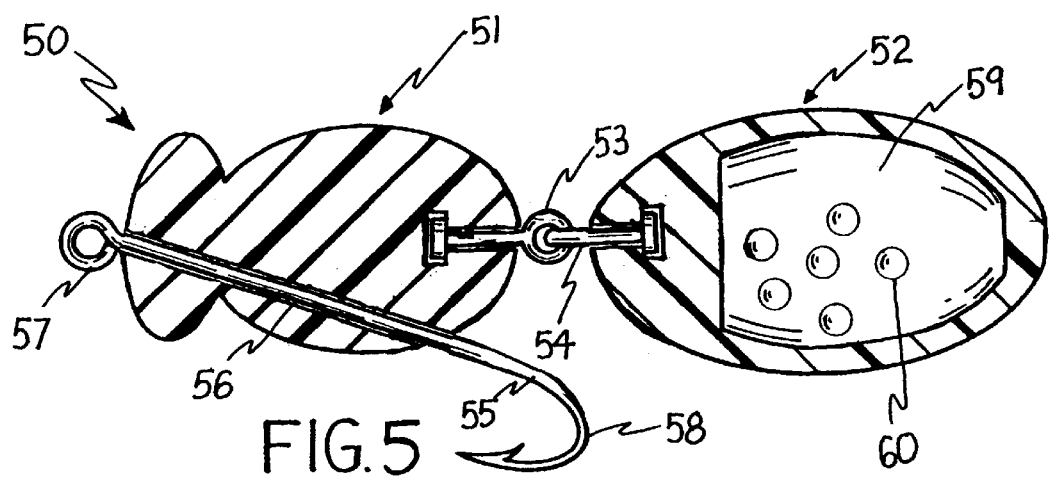
FIG. 5 is a schematic cross sectional view of the embodiment of the present invention illustrated in FIG. 4.

FIGS. 4 and 5 illustrate another embodiment of the fishing lure. In this embodiment, the body member 50 has separate front and back portions 51, 52 which are rotatably coupled to one another by a pair of eyelets 53, 54 to permit rotation of the front and back portions about a common axis. The front shaft 55 in this embodiment is extended into an angled bore 56 in the front portion to permit rotation of the front shaft in this bore. Like the other embodiment, the forwards end of the front shaft is outwardly extended from the front end of the body member and has a front eye loop 57 designed for securing a fishing line thereto. The rearwards end of the front shaft forms a fishing hook 58 outwardly extending from the bottom of the front portion towards the back end of the front portion. In this embodiment, interior cavity 59 of the back portion of the body member has a plurality of ball bearings 60 therein so that movement of the back portion agitates the ball bearing to create a rattle sound to attract fish to the lure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing lure comprising:

a body member having front and back ends, and an outer surface defining an interior boundary therein;

said body member having a longitudinal axis extending between said front and back ends of said body member;

said body member having front and back portions;

said front end of said body member being adapted for securing a fishing line thereto;

said back portion of said body member having an interior cavity therein;

an elongate back shaft having opposite first and second ends, and a longitudinal axis extending between said first and second ends of said back shaft;

said back shaft being extended into said interior cavity of said back portion through said back end of said body member;

said first end of said back shaft being rotatably coupled to said back portion of said body member to permit free rotation of said back shaft about said longitudinal axis of said back shaft;

said second end of said back shaft being adapted for securing a fishing hook thereto; and said second end of said back shaft having a rear eye loop, said rear eye loop having a propeller blade coupled thereto.

2. The fishing lure of claim 1, further comprising a set of interconnected gears being provided in said interior cavity of said back portion, said set of interconnected gears including a drive gear mounted on said back shaft such that rotation of said back shaft rotates said drive gear to rotate said set of interconnected gears, said set of interconnected gears producing sound vibrations when rotated.

3. The fishing lure of claim 1, wherein said outer surface of said body member is shaped to resemble an insect.

4. The fishing lure of claim 1, wherein said outer surface of said body member is shaped to resemble a bee.

5. The fishing lure of claim 1, wherein said front and back portions of said body member are detachably attached to one another.

6. The fishing lure of claim 5, wherein said back portion of said body member has a socket therein, wherein said front portion of said body member has a plug, wherein said front and back portions of said body member each comprise a resiliently deformable material, and wherein said plug of said front portion being inserted into said socket of said back portion to detachably attach said front and back portions of said body member together.

7. The fishing lure of claim 1, wherein said front portion of said body member is formed by a substantially solid material substantially occupying said interior boundary of front portion of said body member.

8. A fishing lure comprising:

a body member having front and back ends, and an outer surface defining an interior boundary therein;

said body member having a longitudinal axis extending between said front and back ends of said body member;

wherein said outer surface of said body member is shaped to resemble an insect;

said body member having front and back portions, said front portion of said body member being positioned adjacent said front end of said body member, said back portion of said body member being positioned adjacent said back end of said body member;

said outer surface of said front portion being shaped to resemble a head and a thorax of the represented insect, said outer surface of said back portion being shaped to resemble an abdomen of the represented insect;

said front and back portions of said body member being detachably attached to one another;

said back portion of said body member having a socket therein;

said front portion of said body member having a plug;

said front and back portions of said body member each comprising resiliently deformable material;

said plug of said front portion being inserted into said socket of said back portion to detachably attach said front and back portions of said body member together;

said front portion of said body member being formed by a substantially solid material substantially occupying said interior boundary of front portion of said body member;

said front portion of said body member having an axial bore through along said longitudinal axis of said body member;

said axial bore of said front portion having a pair of opposite ends, a first of said ends of said axial bore of said front portion forming a front opening in said front end of said body member;

said axial bore of said front portion having an annular shoulder at a second of said ends of said axial bore of said front portion;

an elongate front shaft being extended into said axial bore of said front portion, said front shaft being rotatable in said axial bore of said front portion about said longitudinal axis of said body member;

said front shaft having forwards and rearwards ends;

said forwards end of said front shaft being outwardly extended from said front end of said body member, said forwards end of front shaft having a front eye loop adapted for securing a fishing line thereto;

said rearwards end of said front shaft having a disk-shaped stop abutting said annular shoulder of said axial bore of said front portion;

said back portion of said body member having an interior cavity therein;

an elongate back shaft having opposite first and second ends, and a longitudinal axis extending between said first and second ends of said back shaft;

said back shaft being extended into said interior cavity of said back portion through said back end of said body member;

said first end of said back shaft being extended towards said front end of said body member, said second end of said back shaft being outwardly extended from said back end of said body member, said longitudinal axes of said back shaft and said body member being generally coaxial with one another;

said first end of said back shaft being rotatably coupled to said back portion of said body member to permit free rotation of said back shaft about said longitudinal axis of said back shaft;

said second end of said back shaft having a rear eye loop, said rear eye loop having a propeller blade coupled thereto and extending generally perpendicularly outwards from said longitudinal axis of said back shaft, said propeller blade being adapted for rotating said back shaft as said body member is moved through the water;

a fishing hook being coupled to said rear eye loop, wherein said fishing hook has a least three barbs; and a set of interconnected gears being provided in said interior cavity of said back portion, said set of interconnected gears including a drive gear mounted on said back shaft such that rotation of said back shaft rotates said drive gear to rotate said set of interconnected gears, said set of interconnected gears producing sound vibrations when rotated.

* * * * *